United States Patent
Brunel et al.

(10) Patent No.: US 7,143,750 B2
(45) Date of Patent: Dec. 5, 2006

(54) TANK-INTEGRATED CARBON CANISTER

(75) Inventors: Daniel Brunel, Châlons en Champagne (FR); Pascal Leymarie, Châlons en Champagne (FR); Robert Renaud, Châlons en Champagne (FR)

(73) Assignee: Marwal Systems s.a.s., Châlons en Champagne (FR)

( * ) Notice: Subject to any disclaimer, the term of this patent is extended or adjusted under 35 U.S.C. 154(b) by 125 days.

(21) Appl. No.: 11/006,176

(22) Filed: Dec. 6, 2004

(65) Prior Publication Data

US 2005/0133096 A1 Jun. 23, 2005

(30) Foreign Application Priority Data

Dec. 18, 2003 (FR) .................................. 03 14874

(51) Int. Cl.
*F02M 33/04* (2006.01)
*B01D 47/00* (2006.01)
(52) U.S. Cl. .................. 123/509; 123/516; 123/518
(58) Field of Classification Search ................ 123/509, 123/516, 518–520; 137/565.17
See application file for complete search history.

(56) References Cited

U.S. PATENT DOCUMENTS

| | | | | |
|---|---|---|---|---|
| 4,852,761 A | * | 8/1989 | Turner et al. ................ | 220/746 |
| 4,919,103 A | * | 4/1990 | Ishiguro et al. .............. | 123/514 |
| 5,901,689 A | * | 5/1999 | Kimura et al. .............. | 123/518 |
| 6,182,693 B1 | | 2/2001 | Stack | |
| 6,273,070 B1 | * | 8/2001 | Arnal et al. ................. | 123/519 |
| 6,302,144 B1 | | 10/2001 | Graham | |
| 6,367,458 B1 | * | 4/2002 | Furusho et al. ............. | 123/519 |
| 6,966,305 B1 | * | 11/2005 | Aubree et al. .............. | 123/509 |
| 2001/0029932 A1 | | 10/2001 | Ozaki | |
| 2005/0284450 A1 | * | 12/2005 | Mills .......................... | 123/519 |

FOREIGN PATENT DOCUMENTS

WO    WO 03006273    1/2003

* cited by examiner

*Primary Examiner*—Thomas Moulis
(74) *Attorney, Agent, or Firm*—Reising, Ethington, Barnes, Kisselle, P.C.

(57) ABSTRACT

A fuel pump module and carbon canister assembly adapted for mounting within a fuel tank. A fuel pump module has a flange and a body carried by the flange. A carbon canister is attached to the body of the fuel pump module and is adapted for an inclined orientation with respect to the flange of the fuel pump module. The fuel tank may include a bottom and a top having an opening through which the fuel pump module and carbon canister assembly may be inserted. The carbon canister may be adapted for resting on the bottom of the fuel tank once inserted therein.

40 Claims, 5 Drawing Sheets

FIG. 6

TANK-INTEGRATED CARBON CANISTER

CROSS-REFERENCE TO RELATED APPLICATIONS

Applicants claim right of priority of French Patent Application FR 03 14874 filed Dec. 18, 2003.

FIELD OF THE INVENTION

This invention relates to a fuel tank, and more particularly to a vehicle fuel tank with a carbon canister.

BACKGROUND OF THE INVENTION

In addition to a liquid fuel volume, vehicle fuel tanks also contain a gas volume, which is usually filled by fuel vapors and/or air. Temperature fluctuations lead to corresponding internal-pressure fluctuations in the fuel tank. Excess pressures which occur have to be reduced, but emission regulations mean that fuel vapors must not escape into the atmosphere. The pressure is therefore reduced by bleeding fuel vapors into a canister containing activated carbon through a vent line, which leads from the fuel tank. Such carbon canisters are typically vented to an operating engine to purge from the canisters the fuel vapors, which are burned in the combustion process of the engine. Presently, such carbon canisters are typically remotely located from the fuel tank, such as under a frame of a vehicle. This approach requires providing space under a vehicle frame to accommodate the carbon canister, separately assembling the carbon canister to the vehicle, and routing relatively long vent lines to and from the carbon canister.

A more recent approach involves attaching a separate carbon canister to an exterior surface on a top wall of the fuel tank. The carbon canister extends outside of the fuel tank, wherein one surface of the carbon canister is exposed to the atmosphere and an opposite surface is exposed to the fuel in the fuel tank. Unfortunately, however, this approach still involves providing space on the vehicle to accommodate the protruding carbon canister.

SUMMARY OF THE INVENTION

A fuel pump module and carbon canister assembly is adapted for mounting within a fuel tank. Preferably the fuel pump module has a flange and a body carried by the flange. The carbon canister is connected to the fuel pump module so that when installed in the fuel tank the canister is inclined with respect to the axis of the flange. Preferably, they are connected by an articulated joint which at least during mounting in the tank permits the canister to preferably generally move arcuately relative to the fuel pump module during installation through an opening in the fuel tank. Preferably, the fuel tank includes a bottom and a top having an opening through which the fuel pump module and carbon canister assembly is inserted. It is also preferred that the carbon canister is adapted for resting on the bottom of the fuel tank once inserted therein.

At least some of the objects, features and advantages that may be achieved by at least certain embodiments of the invention include providing a tank-integrated carbon canister that is not separately mounted to the exterior of a fuel tank or to a frame of a vehicle thereby limiting the obstruction generated by the presence of such a separate carbon canister; eliminates the need to separately assemble a carbon canister to a vehicle, and the need to separately route vent lines to and from the carbon canister; reduces the risk of fuel vapors escaping to the atmosphere; eliminates the need for an increased cost of connecting components between the fuel pump module and canister which are highly resistant to fuel vapor permeation; and is of relatively simple design and economical manufacture and assembly, is reliable and in service has a long useful life.

Of course, other objects, features and advantages will be apparent in view of this disclosure to those skilled in the art. Various other fuel tank and carbon canister configurations embodying the invention may achieve more or less than these noted objects, features or advantages.

BRIEF DESCRIPTION OF THE DRAWINGS

These and other objects, features and advantages of the present invention will be apparent from the following detailed description of the preferred embodiments and best mode, appended claims, and accompanying drawings in which:

DETAILED DESCRIPTION OF THE PREFERRED EMBODIMENTS

Figure 1:
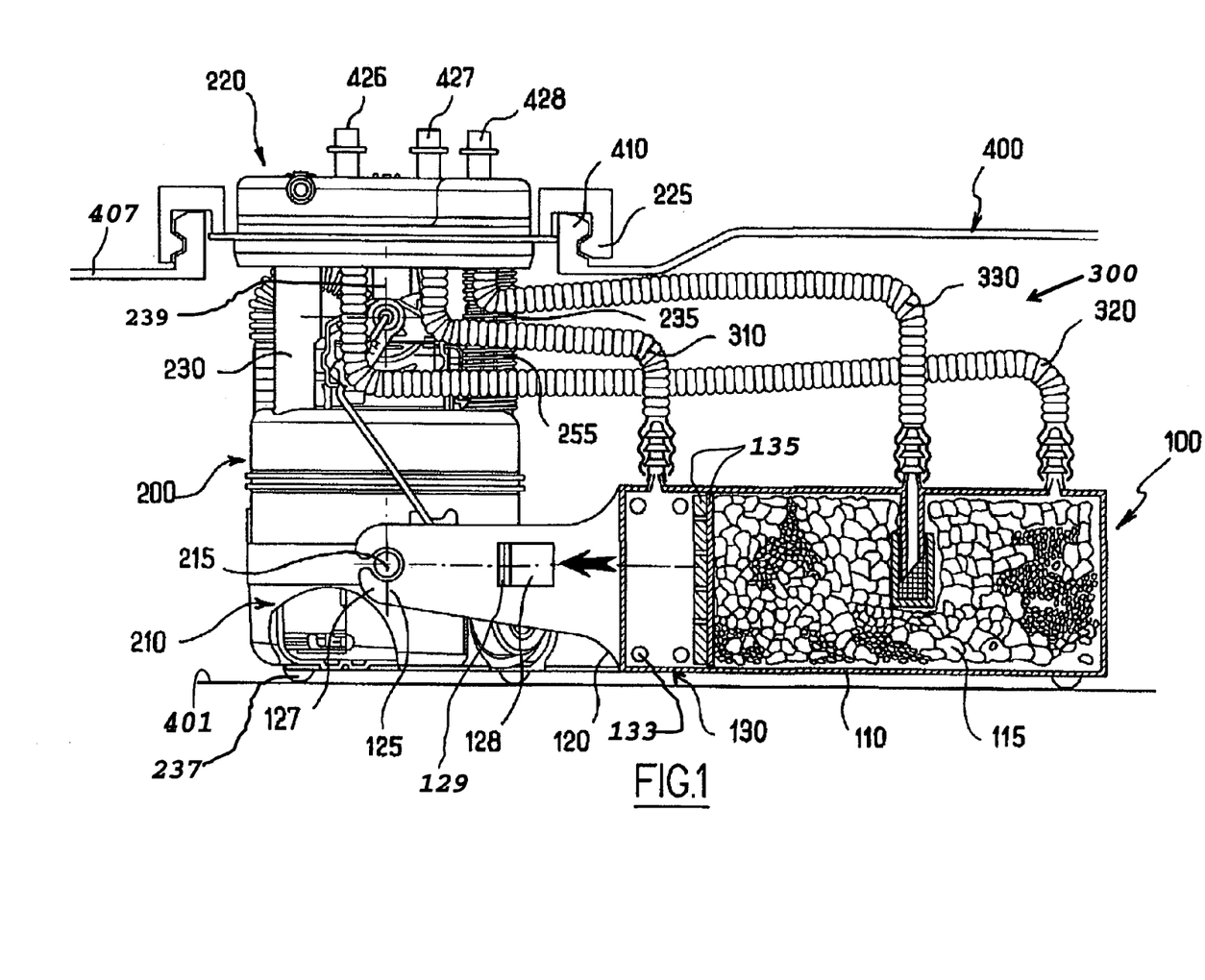
FIG. 1 is a fragmentary cross-sectional view of a fuel tank having therein a fuel pump module and canister assembly with a pivotable canister according to one exemplary embodiment of the present invention.

Referring in detail to the drawings, FIG. 1 illustrates a motor vehicle fuel tank assembly including a fuel tank 400 for housing fuel therein, a sender or fuel pump module 200 for delivering fuel out of the fuel tank 400, and a carbon canister 100 for storing fuel vapors. The fuel tank 400 includes a bottom 401 and a top 407 having an opening therethrough 410. The fuel pump module 200 and carbon canister 100 define an assembly that is pre-assembled before insertion of the assembly into the opening 410 of the fuel tank 400.

The module 200 includes a flange 220 that is threadingly mounted to the open neck or opening 410 of the fuel tank 400 via a threaded flange 225 and includes a body 210 to which a carbon canister 100 is pivotably mounted. The flange 220 extends laterally across the opening 410 and includes a longitudinal axis 239, which may be coincident and/or parallel with respect to the longitudinal axis of the body 210 as shown. In any case, the body 210 is slidably carried by the flange 220 by vertical support posts or columns 230 attached to the flange 220. Preferably, a compression spring 235 circumscribes one of the columns 230 to bias the body 210 in a vertical direction away from the flange 220 and against the bottom 401 of the fuel tank 400. The body 210 includes separate soft elements or cushions 237 for resting the body 210 on the bottom 401 of the fuel tank 400, wherein the fuel module 200 may be bottom referenced with respect to the fuel tank 400. To accommodate the vertically adjustable configuration, the electrical and fluid connections between the body 210 and the flange 220 are flexible. The body 210 externally includes a fuel level sender and internally includes a fuel pump (not shown) and regulator (not shown).

When installed in the fuel tank 400, the carbon canister 100 is oriented obliquely or inclined with respect to the longitudinal axis 239 of the flange 220 of the fuel pump module 200 and rests on the bottom 401 of the fuel tank 400 via separate soft elements 237, wherein the carbon canister 100 may be bottom referenced with respect to the fuel tank 400. In other words, the canister 100 is oriented at an angle with respect to the axis 239 of the flange 220 and does not share a common longitudinal axis therewith when assembled in the fuel tank 400. As used herein, the terms oblique, inclined, and the like, mean angled and, thus, not parallel. The canister 100 includes a generally elongated housing 110 having a mass of activated charcoal or carbon 115 contained therein for absorbing fuel vapors and further includes an extension 120 projecting from one end of the housing 110 that is provided for pivotably mounting the canister 100 to the body 210. The canister 100 includes an actuator 130 for pressurizing the carbon 115 including a helical compression spring 133 compressed against a transversely extending wall segment(s) 135. Those of ordinary skill in the art will recognize that the wall segment(s) 135 are displaceable so as to compact the carbon 115 within the canister 110.

As is generally known to those of ordinary skill in the art of carbon canister design, several conduits 300 may be flexibly connected between the housing 110 of the canister 100 and the flange 220 of the module 200 for conveying gaseous fluid therethrough including fuel vapor and/or air. The conduits 300 may be separate components adapted to connect to fluid fittings, and may alternatively be integral components molded with one or both of the canister 100 or module 200. In just one of many possible exemplary implementations, a ventilation conduit 310 may communicate with the actuator 130 at one end of the canister 100, and another ventilation conduit 320 may communicate with the activated carbon 115 at an opposite end of the canister 100. One of the ventilation conduits 310, 320 may convey fuel vapor to and/or from the canister 100 and the other of the ventilation conduits 310, 320 may convey air to and/or from the canister 100. A suction conduit 330 may communicate with the activated carbon 115, preferably between the ventilation conduits 310, 320. The conduit 330 may convey fuel vapors out of the canister 100 and to the flange 220, for downstream combustion within an engine. At the flange 220, the conduit 330 may be in fluid communication with a rollover valve (not shown), which may be in normally open communication with the interior of the fuel tank 400. Alternatively, and not depicted in FIG. 1, the rollover valve (not shown) could be positioned at least partially externally of the fuel tank 400, in which case the conduit 330 would make an exit and return loop out of and back into the fuel tank 400. The flange 220 includes several fittings 426, 427, 428, some or all of which may be in communication with one or more of the various conduits 300 and adapted to be connected to other parts of the vehicle such as the vehicle engine. Various other canister venting schemes are well within knowledge of those of ordinary skill in the art.

Still referring to the carbon canister 100 of FIG. 1, the extension 120 includes two laterally spaced apart fastening arms 125 (one shown) disposed on either side of the module 200. The fastening arms 125 terminate in semi-circumferential portions 127 that form circular openings that loosely and partially encircle projections or axles 215 integrally extending from opposed sides of the body 210 of the module 200. Accordingly, the portions 127 and axles 215 cooperate in a type of swiveling ball-and-socket joint, or articulated or pivoting joint, so as to pivotably mount the canister 100 to the module 200.

Although the longitudinal length of the module and canister assembly is greater than the generally vertical distance between an opening 410 of the fuel tank 400 and the bottom 401 of the fuel tank 400, the module and canister assembly is easily installed in the fuel tank 400. The free end of the housing 110 is inserted into the opening 410 such that the canister 100 is vertically introduced into the fuel tank 400. Once the canister 100 is substantially inserted into the fuel tank 400 the canister 100 may be pivoted relative to the module 200 into the generally horizontal orientation as shown. The pivotable connection of the extension 120 to the module 200 serves to prevent the canister 100 from slipping on the bottom 401 of the fuel tank 400, but permits the canister 100 to pivot after the canister 100 is placed on the bottom 401 of the fuel tank 400. Alternatively, pivoting may be prevented after installation of the carbon canister 100 into the fuel tank 400 such as by a flexible, resilient, and/or elastic pin or projection 129 that is molded into the module body 210 and that projects into and cooperates with a window 128 in the extension 120 of the canister 100. In other words, as the canister 100 is swung from its generally vertical position to its generally horizontal position, the window 128 overlaps the projection 129, which then snaps into the window 128 when the canister 100 reaches its generally horizontal orientation as shown. Moreover, the canister 100 may be laterally adjusted or translatably mounted with respect to the fuel module 200, wherein the arms 125 may be disconnected from the module body 210 by disengaging the portions 127 from the axle 215. Then, as indicated by the bold arrow, the canister 100 may be displaced relative to the module 200 to the extent permitted by the projection 129 cooperating with the window 128. In contrast to the pivotable connection of the canister 100 to the module 200 of FIG. 1, the canister 100 may be rigidly connected to the module 200 as will now be described with reference FIG. 2.

Figure 2:
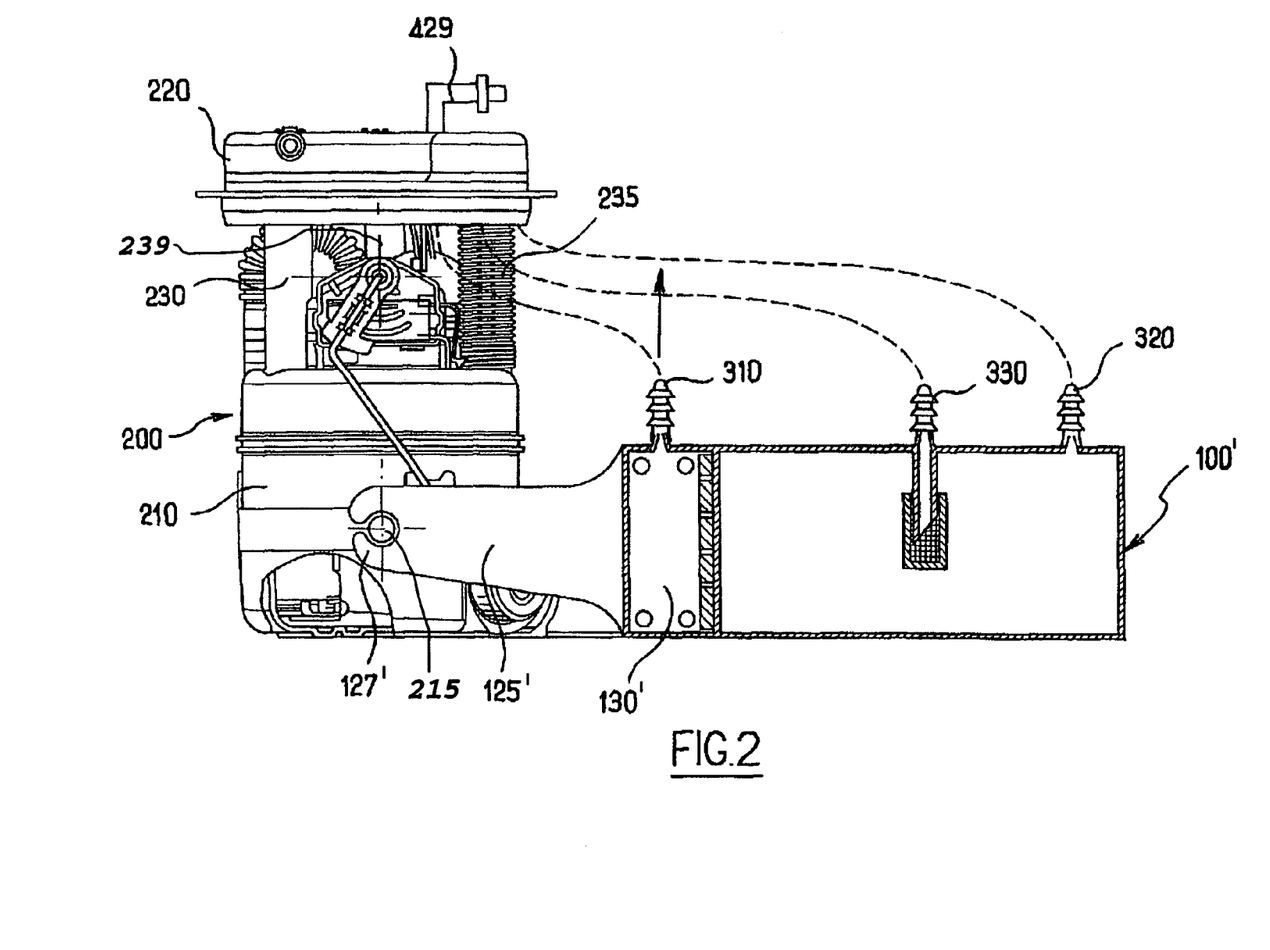
FIG. 2 is a fragmentary cross-sectional view of a fuel tank assembly having a fixed canister according to a second exemplary embodiment of the present invention.

FIG. 2 illustrates another exemplary embodiment of the present invention. This embodiment is similar in many respects to the embodiment of FIG. 1 and like numerals between the embodiments generally designate like or corresponding elements throughout the several views of the drawing figures. Additionally, the common subject matter will generally not be repeated here.

Here, the canister 100' is oriented obliquely or is inclined at a generally right angle with respect to the axis 239 of the flange 220 of the module 200 and is rigidly connected to the module 200 by projections or portions 127' of arms 125' which are tightly clamped about the axle 215 of the module body 210 so as to prevent any pivoting of the canister 100' relative to the module 200. Therefore, the module 200 and canister 100' are assembled to the fuel tank (not shown) by initially introducing the canister 100' into the opening (not shown) of the fuel tank in a generally vertical orientation. Then, as the canister 100' is inserted into the fuel tank, the module 200 and canister 100' are turned as a unit so as to permit the canister 100' to come to rest in a generally horizontal orientation on the bottom of the fuel tank. Moreover, the flange 220 of the module 200 includes an elbow fitting 429 that is provided to accommodate a better connection to the canister 100' via an external loop (not shown) with the fuel tank. Finally, the module 200 and canister 100' do not rest or bear on the bottom of the fuel tank via soft rest elements as with the embodiment of FIG. 1. Rather, the module 200 and canister 100' rest on the bottom of the fuel tank via integral projections of the module 200 and canister 100'.

Figure 3:
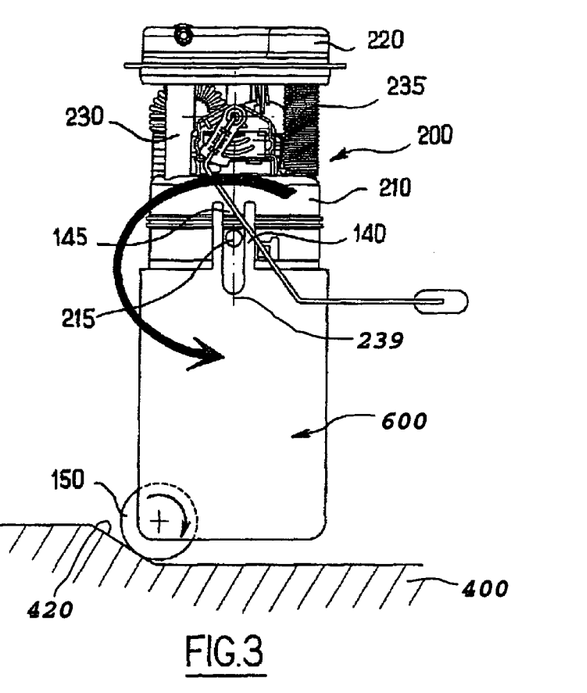
FIG. 3 is a fragmentary cross-sectional view of a fuel tank assembly having a pivotable carbon canister disposed in a vertical orientation according to a third exemplary embodiment of the present invention.
Figure 4:
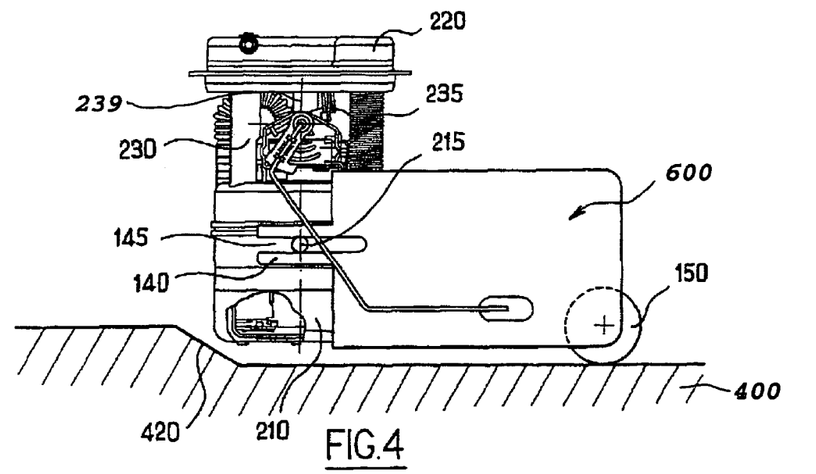
FIG. 4 is a fragmentary cross-sectional view of the fuel tank assembly of FIG. 3 wherein the carbon canister is disposed in a horizontal orientation.

FIGS. 3 and 4 illustrate another exemplary embodiment of the present invention. This embodiment is similar in many respects to the embodiment of FIGS. 1 and 2, and like numerals between the embodiments generally designate like or corresponding elements throughout the several views of the drawing figures. Additionally, the common subject matter will generally not be repeated here.

Here, the fuel module assembly is defined by the fuel module 200 and a carbon canister 600, which is modified from the canister 100 of FIG. 1. As before, the body 210 of the fuel module 200 is biased away from the flange 220 by the compression spring 235, which surrounds one of the supports or columns 230. The body 210 also includes the axles 215 projecting therefrom on either side thereof. Unlike the embodiment of FIG. 1, however, here the canister 600 includes forks 140, one on either side of the canister 600, that define open elongated apertures 145 for pivotable and translatable cooperation with the axles 215. In other words, the canister 600 is both pivotable and translatable with respect to the body 210 of the module 200 and is preferably obliquely oriented or inclined with respect to the axis 239 of the flange 220 of the module 200 when assembled within the fuel tank 400.

To facilitate installation of the assembly into the fuel tank 400 a caster wheel 150 is rotatably mounted to a portion of the canister 600. The caster wheel 150 preferably cooperates with a sloped portion 420 of the bottom of the fuel tank 400 to facilitate pivoting of the canister 600 about the axles 215 of the module 200, as the assembly is inserted into the fuel tank 400. The caster wheel 150 rolls along the bottom of the fuel tank 400 as the canister 600 pivots from its generally vertical orientation of FIG. 3 and until the canister 600 comes to rest at the bottom of the fuel tank 400 in a generally horizontal orientation as shown in FIG. 4. Alternatively, the sloped portion 420 is not necessary as the offset caster wheel 150 could independently enable the canister 600 to pivot relative to the module 200.

Figure 5:
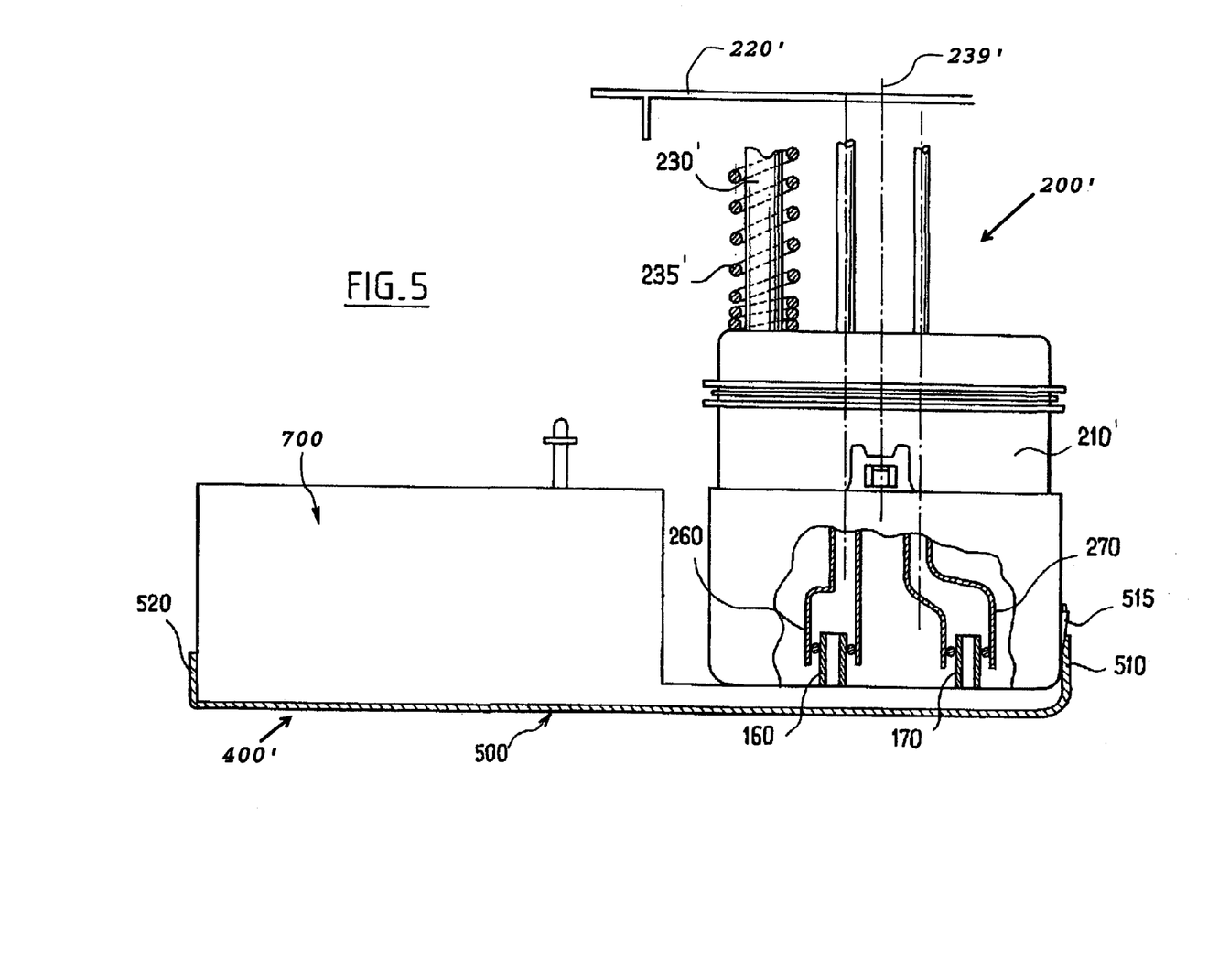
FIG. 5 is a fragmentary cross-sectional view of a fuel tank assembly having a horizontally mounted canister fixed to a bottom of a fuel tank according to a fourth exemplary embodiment of the present invention.

FIG. 5 illustrates another exemplary embodiment of the present invention. This embodiment is similar in many respects to the embodiment of FIGS. 1 through 4, and like numerals between the embodiments generally designate like or corresponding elements throughout the several views of the drawing figures. Additionally, the common subject matter will generally not be repeated here.

The fuel tank assembly includes a fuel tank 400' having a module well 500 defined by opposed walls 510, 520 wherein a fuel module assembly, which is defined by a fuel module 200' and carbon canister 700, is disposed between the walls 510, 520. The canister 700 is translatably connected to a body 210' of the module 200' via a sealed telescopic linkage of male canister conduits 160, 170 into female module conduits 260, 270. When installed in the fuel tank 400', the carbon canister 100 is oriented obliquely or is inclined with respect to an axis 239' of a flange 220' of the fuel module 200'. The fuel module assembly is inserted into the fuel tank 400' by initially introducing the canister 700 into the opening (not shown) of the fuel tank 400' in a generally vertical orientation. Then, as the canister 700 is further inserted into the fuel tank 400', the module 200' and canister 700 are turned or swung as a unit so as to permit the canister 700 to come to rest in a generally horizontal orientation in the well 500 on the bottom of the fuel tank 400 with a distal end of the canister 700 engaging the wall 520 and a portion of the body 210' of the module 200' engaging the opposed wall 510. The distance between the walls 510, 520 is substantially equal to the combined width of the canister 700 and module 200' for a snug fit therebetween. Nevertheless, one or more pins or clips 515 may be provided to fix the assembly within the well 500 of the fuel tank 400'. Finally, as with previous embodiments, compression springs 235' surround support columns or posts 230' to bias the module 200' and, in this embodiment, at least a portion of the canister 700 against the bottom of the fuel tank 400' within the well 500. As with the previous embodiments, this spring 235' enables a good fit of the assembly to the fuel tank 400' by accommodating dimensional variations therebetween. In other words, to the extent there are gaps in dimensions between the assembly and the fuel tank 400', the spring 235' is provided to ensure that the assembly comes to rest at the bottom of the fuel tank 400'.

Figure 6:
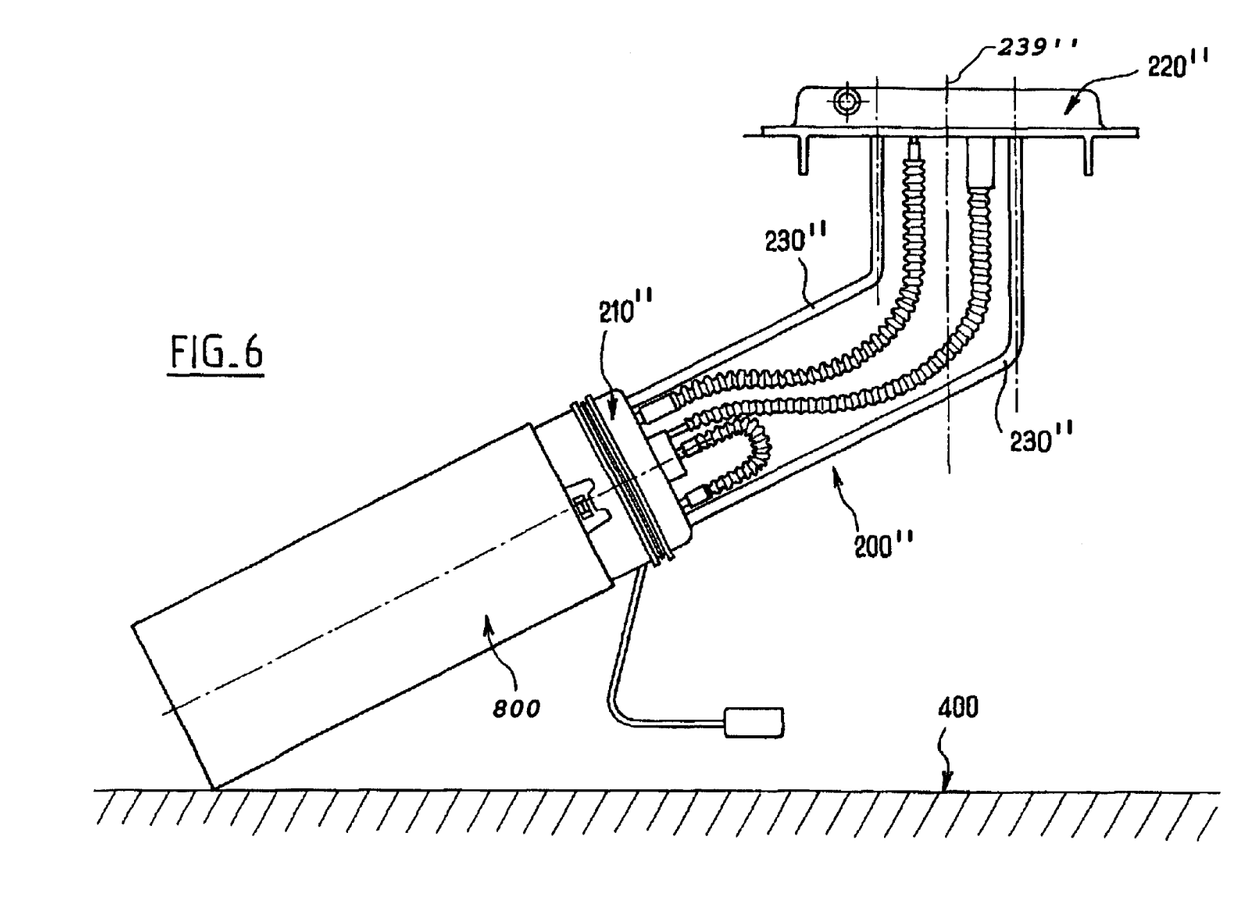
FIG. 6 is a fragmentary cross-sectional view of a fuel tank assembly according to a fifth exemplary embodiment of the present invention.

FIG. 6 illustrates yet another exemplary embodiment of the present invention. This embodiment is similar in many respects to the embodiment of FIGS. 1 through 5, and like numerals between the embodiments generally designate like or corresponding elements throughout the several views of the drawing figures. Additionally, the common subject matter will generally not be repeated here.

The fuel tank assembly includes the fuel tank 400 wherein a fuel module assembly is defined by a fuel module 200" having a body 210" that is obliquely oriented or inclined with respect to the axis 239" a flange 220" of the fuel module 200". As shown, a carbon canister 800 clips to and forms an extension of the body 210". The inclined positioning of the body 210" and canister 800 enables the body 210" and canister 800 to be packaged within the tank 400. Preferably, a free end of the canister 800 is in contact with the bottom of the tank 400.

The free end of the canister 800 is biased into such contact with the tank 400 so as to elastically deform flexible columns 230" that connect the flange 220" to the body 210". In other words, the fuel module 200" is mounted to tank 400 in such a manner as to ensure that the free end of the canister 800 is always in contact with the bottom of the tank 400 when the flange 220" of the module 200" is mounted to the top of the tank 400. Although not shown, the columns 230" can be kneecap-like or ball-and-socket columns surround by helicoid springs (not shown). Preferably, the columns 230" exhibit a limited degree of flexibility.

With one or more of the fuel delivery modules of the above-described embodiments, there is provided a pump, pressure regulator, and level sensor. The various components disclosed herein are preferably composed of fuel resistant materials such as a POM material. It is also contemplated that the carbon canister can take the form of a fuel pipe. The canisters of the various embodiments of the present invention are preferably immersed in at least partially liquid fuel within the fuel tank when the tank is half-filled with liquid fuel and preferably fully immersed when the tank is substantially completely filled with liquid fuel. The various configurations disclosed herein allow the fuel module and canister assembly to be installed into a fuel tank without having to manually reach into the fuel tank.

The fact that the canister is maintained and/or guided by the fuel pump module to which it is attached at the time of installation of the module and canister assembly in a fuel tank, precludes the need to use a complex attachment of the canister to an internal wall of the tank. Such a module and canister assembly can be adapted to many different existing tank shapes without any modification of such tanks. Preferably, the canister and module are constructed as a self-contained sub-assembly that may be assembled to a fuel tank on an assembly line to form a fuel tank assembly.

While the forms of the invention herein disclosed constitute a presently preferred embodiment, many others are possible. It is not intended herein to mention all the possible equivalent forms or ramifications of the invention. It is understood that terms used herein are merely descriptive, rather than limiting, and that various changes may be made without departing from the spirit and scope of the invention as defined by the following claims.

What is claimed is:

1. A vehicle fuel tank assembly comprising:
   a fuel tank including a bottom and a top having an opening therethrough; and
   a fuel pump module and carbon canister assembly adapted for insertion through the opening of the fuel tank and being at least partially disposed within the fuel tank, the fuel pump module and carbon canister assembly comprising:
      a fuel pump module having a flange adapted for mounting to the fuel tank at the opening thereof and a body carried by the flange, the flange having a longitudinal axis; and
      a carbon canister attached to the fuel pump module and being positioned within the fuel tank such that the carbon canister is at least partially immersed with fuel when the tank is half full and totally immersed when the tank is full, the carbon canister being inclined with respect to the longitudinal axis of the flange of the fuel pump module.

2. The fuel tank assembly of claim 1 wherein the carbon canister is pivotably attached to the body of the fuel pump module.

3. The fuel tank assembly of claim 2 wherein the body includes at least one projection and the carbon canister includes at least one extension pivotably mounted to the at least one projection.

4. The fuel tank assembly of claim 3 wherein the extension of the carbon canister includes an aperture and the body includes a projection adapted to fit into the aperture at a predetermined desired angular orientation when the carbon canister is pivoted with respect to the body.

5. The fuel tank assembly of claim 2 wherein the carbon canister is also translatably mounted to the body.

6. The fuel tank assembly of claim 5 wherein the carbon canister includes at least one extension having at least one open ended slot and the body includes at least one projection in cooperation with the at least one open ended slot.

7. The fuel tank assembly of claim 2 wherein the carbon canister includes at least one roller attached thereto and being adapted for engaging the bottom of the fuel tank to facilitate pivoting of the carbon canister as the fuel pump module and carbon canister assembly is assembled into the fuel tank.

8. The fuel tank assembly of claim 7 wherein the bottom of the fuel tank includes a sloped portion for cooperation with the at least one roller of the carbon canister as the fuel pump module and carbon canister assembly is assembled into the fuel tank.

9. The fuel tank assembly of claim 1 wherein the carbon canister is fixedly mounted to the body of the fuel pump module.

10. The fuel tank assembly of claim 9 wherein the body of the fuel module includes at least one projection and the carbon canister includes at least one extension fixed to the at least one projection.

11. The fuel tank assembly of claim 9 wherein the body and the carbon canister are oriented obliquely with respect to the flange and share a common longitudinal axis.

12. The fuel tank assembly of claim 1 wherein the carbon canister is translatably mounted to the body of the fuel pump module.

13. The fuel tank assembly of claim 12 wherein the body includes a first set of conduits and the carbon canister includes a second sect of conduits in telescopic fluid communication with the first set of conduits.

14. The fuel tank assembly of claim 13 wherein the bottom of the fuel tank includes a well having opposed walls, further wherein the carbon canister and the fuel pump module fit with the well between the opposed walls.

15. The fuel tank assembly of claim 1 wherein at least a portion of the carbon canister is adapted to be in contact with the bottom of the fuel tank.

16. The fuel tank assembly of claim 15 wherein the carbon canister is adapted to lay substantially horizontally against the bottom of the fuel tank.

17. The fuel tank assembly of claim 1 wherein the body includes a fuel pump.

18. The fuel tank assembly of claim 1 wherein the body is slidably carried by the flange.

19. The fuel tank assembly of claim 18 further including at least one compression spring positioned between the flange and body for biasing the body into contact with the bottom of the fuel tank for bottom referencing the fuel module with respect to the fuel tank.

20. The fuel tank assembly of claim 1 wherein the carbon canister is positioned within the fuel tank such that the carbon canister is at least partially immersed with fuel when the tank is half full and totally immersed when the tank is full.

21. A fuel pump module and carbon canister assembly, adapted for assembly within a fuel tank, comprising:
    a fuel pump module having a flange and a body carried by the flange, the flange having a longitudinal axis; and
    a carbon canister attached to the body of the fuel pump module and being adapted for an inclined orientation with respect to the longitudinal axis of the flange of the fuel pump module.

22. The assembly of claim 21 wherein the carbon canister is pivotably attached to the body of the fuel pump module.

23. The assembly of claim 22 wherein the body includes at least one projection and the carbon canister includes at least one extension pivotably mounted to the at least one projection.

24. The assembly of claim 23 wherein the extension of the carbon canister includes an aperture and the body includes a projection adapted to fit into the aperture at a predetermined desired angular orientation when the carbon canister is pivoted with respect to the body.

25. The assembly of claim 22 wherein the carbon canister is also translatably mounted to the body.

26. The assembly of claim 25 wherein the carbon canister includes at least one extension having at least one open ended slot and the body includes at least one projection in cooperation with the at least one open ended slot.

27. The assembly of claim 22 wherein the carbon canister includes at least one roller attached thereto and being adapted for engaging the bottom of the fuel tank to facilitate pivoting of the carbon canister as the fuel pump module and carbon canister assembly is assembled into the fuel tank.

28. The assembly of claim 27 wherein the bottom of the fuel tank includes a sloped portion for cooperation with the at least one roller of the carbon canister as the fuel pump module and carbon canister assembly is assembled into the fuel tank.

29. The assembly of claim 21 wherein the carbon canister is fixedly mounted to the body of the fuel pump module.

30. The assembly of claim 29 wherein the body of the fuel module includes at least one projection and the carbon canister includes at least one extension fixed to the at least one projection.

31. The assembly of claim 29 wherein the body and the carbon canister are oriented transversely with respect to the longitudinal axis of the flange and share a common longitudinal axis.

32. The assembly of claim 21 wherein the carbon canister is translatably mounted to the body of the fuel pump module.

33. The assembly of claim 32 wherein the body includes a first set of conduits and the carbon canister includes a second set of conduits in telescopic fluid communication with the first set of conduits.

34. The assembly of claim 33 wherein the bottom of the fuel tank includes a well having opposed walls, further wherein the carbon canister and the fuel pump module fit with the well between the opposed walls.

35. The assembly of claim 21 wherein at least a portion of the carbon canister is adapted to be in contact with the bottom of the fuel tank.

36. The assembly of claim 35 wherein the carbon canister is adapted to lay substantially horizontally against the bottom of the fuel tank.

37. The assembly of claim 21 wherein the body includes a fuel pump.

38. The assembly of claim 21 wherein the body is slidably carried by the flange.

39. The assembly of claim 38 further including at least one compression spring positioned between the flange and body for biasing the body into contact with the bottom of the fuel tank.

40. The assembly of claim 21 wherein the carbon canister is positioned within the fuel tank such that the carbon canister is at least partially immersed with fuel when the tank is half full and totally immersed when the tank is full.

* * * * *